(12) United States Patent
Taylor et al.

(10) Patent No.: US 10,202,907 B2
(45) Date of Patent: Feb. 12, 2019

(54) SCREW ON THROTTLE BODY ADAPTER

(71) Applicant: Continental Automotive Systems, Inc., Auburn Hills, MI (US)

(72) Inventors: Donald Taylor, Chatham (CA); John Norman Stockbridge, Waterford, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 339 days.

(21) Appl. No.: 14/972,471

(22) Filed: Dec. 17, 2015

(65) Prior Publication Data

US 2016/0377001 A1    Dec. 29, 2016

Related U.S. Application Data

(60) Provisional application No. 62/183,962, filed on Jun. 24, 2015.

(51) Int. Cl.
    *F02D 9/10*      (2006.01)
    *F02D 11/10*      (2006.01)

(52) U.S. Cl.
    CPC ........... *F02D 9/1035* (2013.01); *F02D 9/107* (2013.01); *F02D 11/10* (2013.01)

(58) Field of Classification Search
    CPC .......... F02D 9/1065; F02D 9/107; F02D 9/08; F02D 9/1035; F02D 9/1095; F02D 9/105; F02D 9/10; F02D 9/108
    USPC ....................................................... 123/337
    See application file for complete search history.

(56) References Cited

U.S. PATENT DOCUMENTS

| | | |
|---|---|---|
| 7,574,797 B2 | 8/2009 | Rauch et al. |
| 2006/0017036 A1* | 1/2006 | Rauch ................... F02D 9/1065 251/305 |
| 2006/0157663 A1* | 7/2006 | Rauch ................... F02D 9/1065 251/305 |
| 2011/0089681 A1 | 4/2011 | Schutte et al. |
| 2015/0000096 A1 | 1/2015 | Gilbreath |
| 2015/0108256 A1* | 4/2015 | Flynn ................... F02M 61/184 239/562 |

FOREIGN PATENT DOCUMENTS

| | | | |
|---|---|---|---|
| CN | 103732970 A | 4/2014 | |
| CN | 103968035 A | 8/2014 | |
| CN | 104214023 A | 12/2014 | |
| EP | 2184468 A1 * | 5/2010 | ........... F02D 9/1035 |

OTHER PUBLICATIONS

Office Action dated Sep. 7, 2018 from corresponding Chinese Patent Application No. 20160467248.8.

\* cited by examiner

*Primary Examiner* — Sizo Vilakazi

(57) ABSTRACT

An adapter assembly connected to a throttle body housing of an electronic throttle control assembly with a connecting feature. The adapter assembly of the present invention provides significantly lower cost assembly, and permits single side molding of the adapter assembly. The adapter assembly also includes alternative features for a captured seal or a void to contain excess thread sealer, and also permits a an anti-rotation feature, or locking tab, that is indexed to the receiving element, where the screw stop angle of the adapter assembly does not have to be controlled to provide a desired tab orientation.

25 Claims, 5 Drawing Sheets

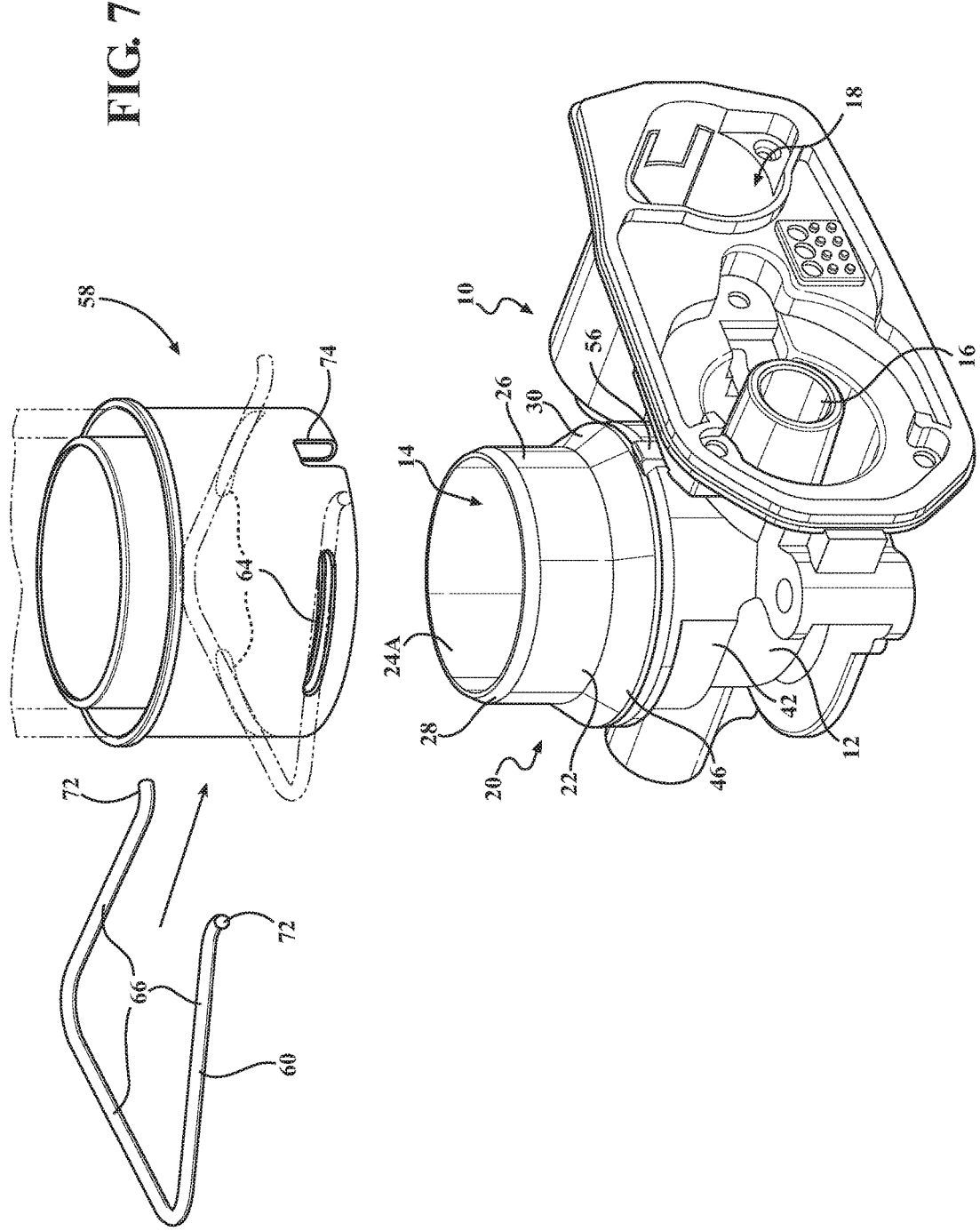

SCREW ON THROTTLE BODY ADAPTER

CROSS-REFERENCE TO RELATED APPLICATIONS

This application claims the benefit of U.S. Provisional Application No. 62/183,962 filed Jun. 24, 2015. The disclosure of the above application is incorporated herein by reference.

FIELD OF THE INVENTION

The invention relates generally to an adapter assembly which is connected to a housing of an electronic throttle control assembly, where the adapter assembly is suitable for connection with a pipe or conduit.

BACKGROUND OF THE INVENTION

Electronic throttle bodies are generally known, and it is typical for a conduit to be in fluid communication with the throttle body for directing air into the throttle body, where the throttle body controls the flow of the air into an engine. Typical throttle bodies are made as a single component, but certain parts that are formed as part of the throttle body are more complex, and expensive to manufacture. In some instances, it may be advantageous to form certain parts separately, and connect them during assembly. However, there are certain features of the electronic throttle body that are required for suitable operation, the functionality of which may be affected if particular parts are manufactured separately.

Accordingly, there exists a need for a throttle body which maintains performance, but is simpler to manufacture.

SUMMARY OF THE INVENTION

The present invention is a throttle body adapter assembly having a threaded section, with a housing of the electronic throttle control assembly receiving the threaded section. The throttle body adapter assembly of the present invention provides significantly lower cost assembly, and permits single side molding during manufacturing of the throttle body adapter assembly.

The throttle body adapter assembly of the present invention provides alternative features for a captured seal or a void to contain excess thread sealer, and also permits a locking tab/anti-rotation feature that is indexed to the receiving element, where the screw stop angle for the adapter assembly does not have to be controlled to provide a desired orientation of the locking tab.

In one embodiment, the present invention is an electronic throttle control assembly which includes a throttle body housing, a central port, the throttle body housing forming part of the central port, an upper flange section formed as part of the throttle body housing, and an adapter assembly connected to the throttle body housing.

The adapter assembly includes a housing portion, a first aperture formed as part of the housing portion, a first diameter portion formed as part of the housing portion, and a second diameter portion formed as part of the housing portion, the first diameter portion and the second diameter portion are part of the first aperture, and the first aperture is part of the central port. A first tapered portion is formed as part of the housing portion such that the first tapered portion is adjacent the first diameter portion, and a second tapered portion is formed as part of the housing portion such that the second tapered portion is disposed between the first diameter portion and the second diameter portion.

A retaining surface is formed as part of the housing portion such that the retaining surface is adjacent the second tapered portion and substantially perpendicular to the second diameter portion. A third diameter portion is formed as part of the housing portion, such that the third diameter portion is part of the first aperture.

A first threaded section is formed as part of the third diameter portion, a second threaded section is formed as part of the upper flange section, an end surface is formed as part of the third diameter portion, and a stopper surface formed as part of the upper flange section. The adapter assembly is connected to the throttle body housing by engaging the first threaded section with the second threaded section, and rotating the housing portion until the end surface of the third diameter portion contacts the stopper surface of the upper flange section.

A retention feature is integrally formed with the upper flange section, a third tapered portion is part of the retention feature, and a second retaining surface is adjacent the third tapered portion. The second retaining surface is substantially parallel to the first retaining surface, such that an attachment feature of a conduit is disposed between the first retaining surface and the second retaining surface when the conduit is connected to the adapter assembly.

A locking tab integrally formed with the upper flange section. In one embodiment, the attachment feature is held between the first retaining surface and the second retaining surface by the locking tab.

In one embodiment, the locking tab is integrally formed around the circumference of the upper flange section, and the throttle body adapter may be positioned relative to the throttle body housing independently of where the locking tab is located.

In yet another embodiment, the throttle body housing is formed as a single component, and the adapter assembly is formed as a single component, such that the throttle body housing and the adapter assembly do not have any joints or weld seams, further preventing leaks.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a second exploded view of an exploded view of an electronic throttle control assembly having an adapter assembly, according to embodiments of the present invention.

DETAILED DESCRIPTION OF THE PREFERRED EMBODIMENTS

Figure 1:
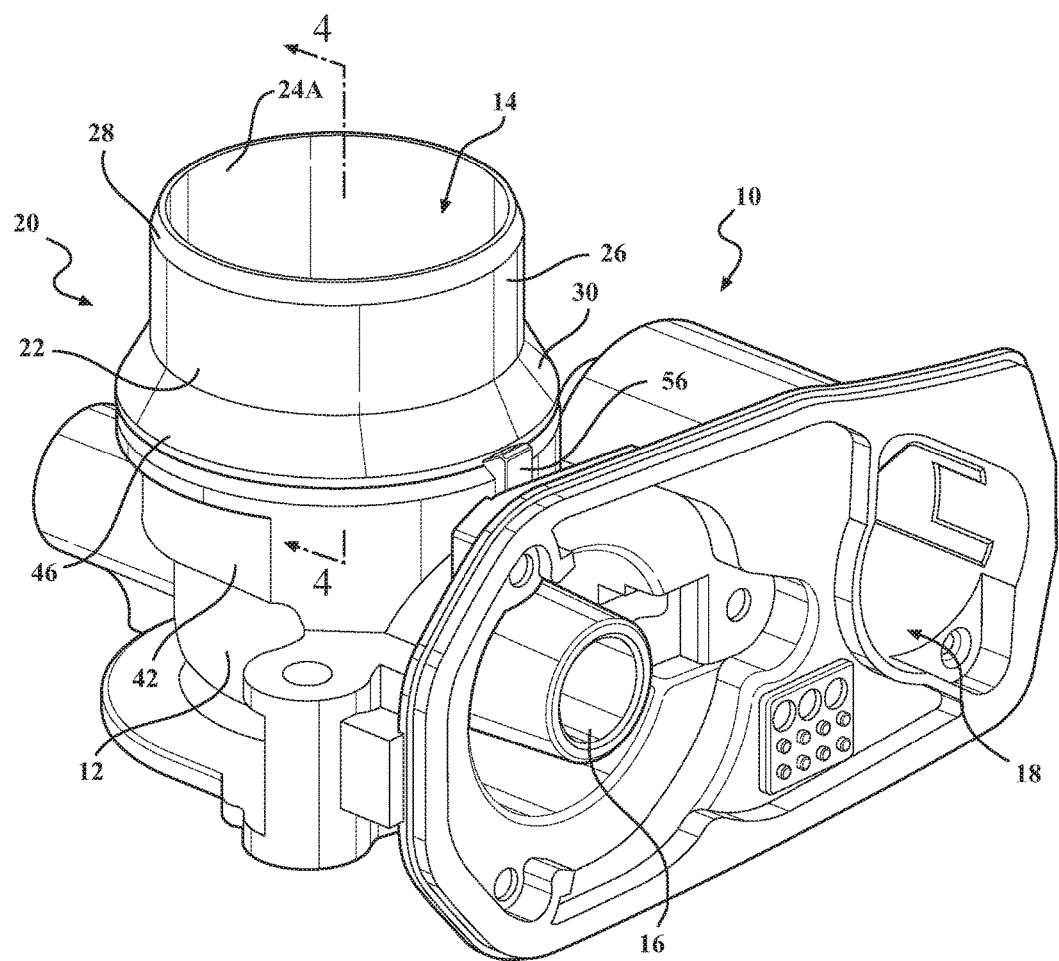
FIG. 1 is a perspective view of an electronic throttle control assembly having an adapter assembly, according to embodiments of the present invention.
Figure 2:
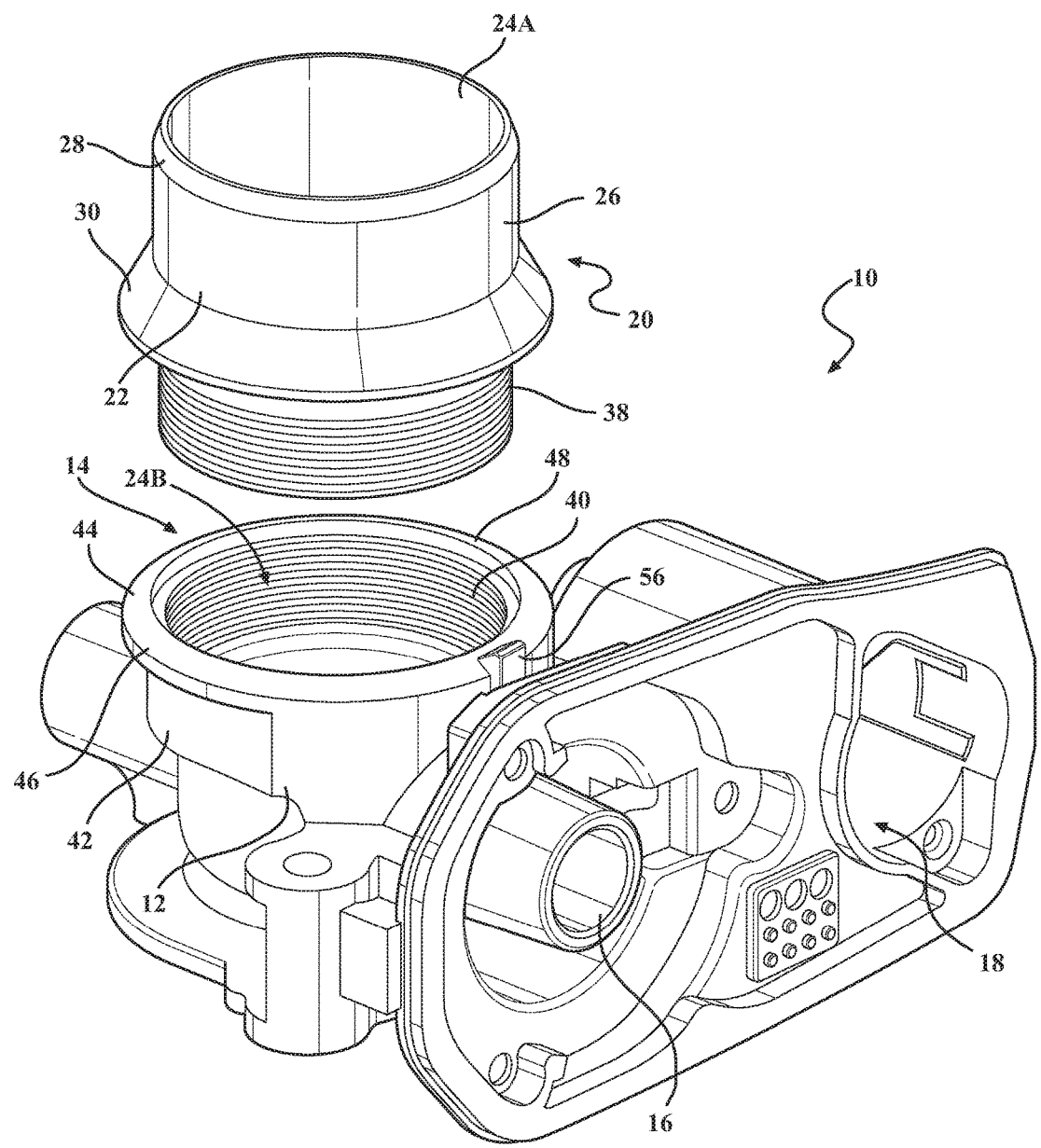
FIG. 2 is an exploded view of an electronic throttle control assembly having an adapter assembly, according to embodiments of the present invention.
Figure 3:
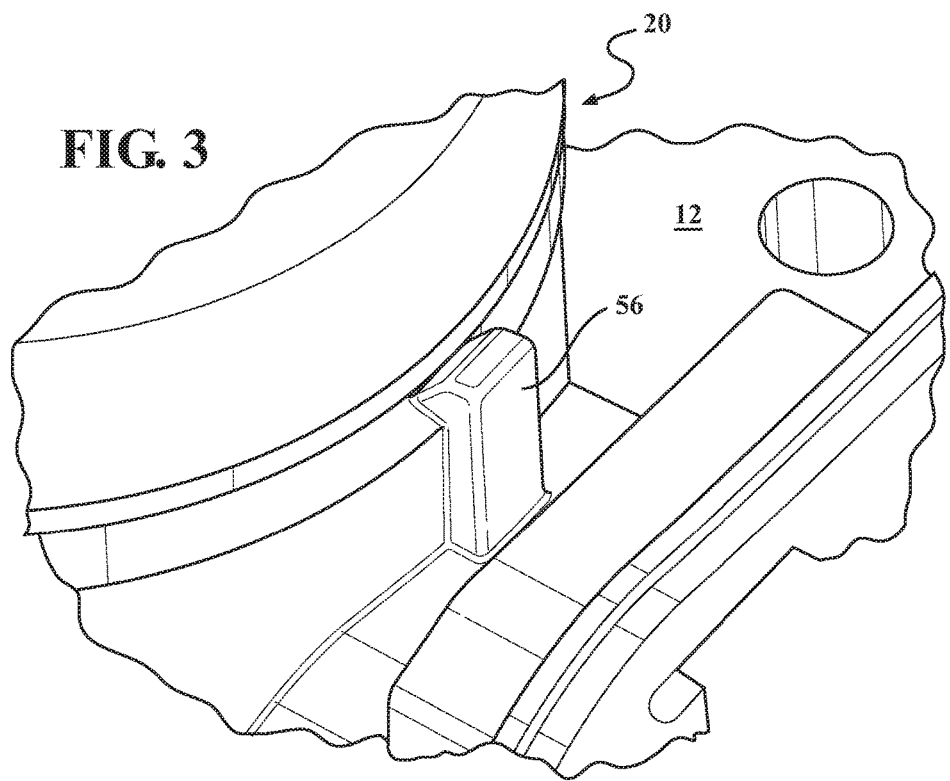
FIG. 3 in an enlarged view of a portion of an electronic throttle control assembly having an adapter assembly, according to embodiments of the present invention.
Figure 4:
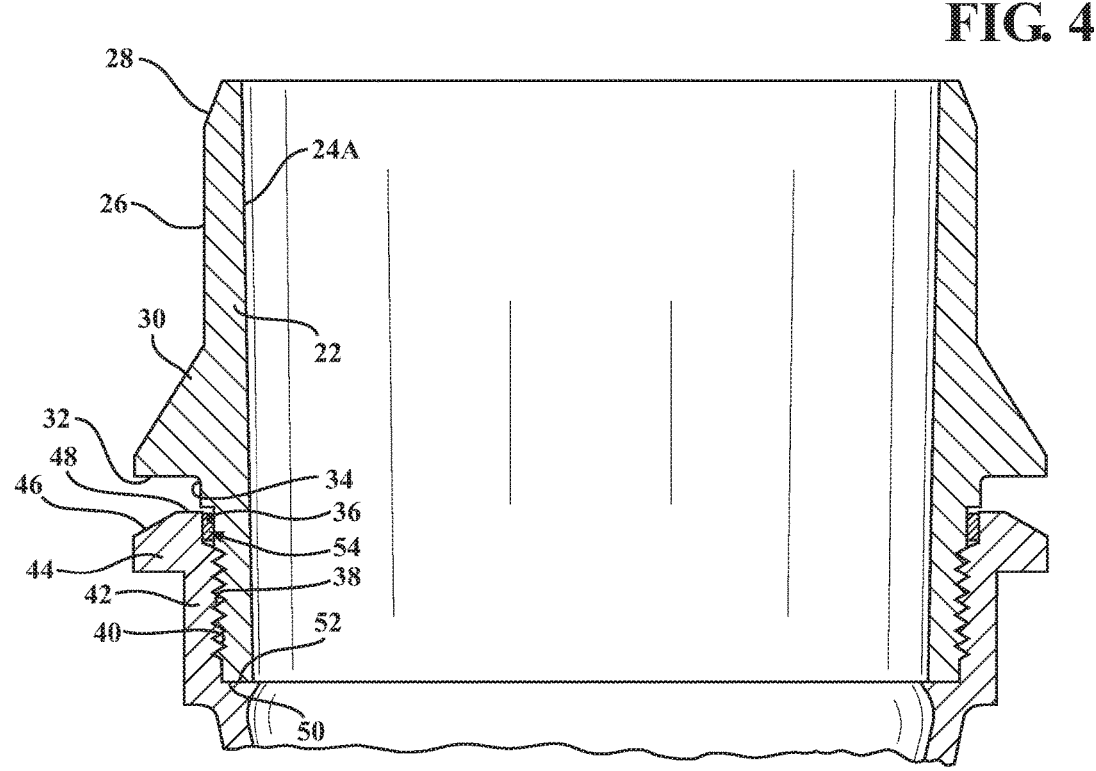
FIG. 4 is a sectional side view taken along lines 4-4 of FIG. 1.
Figure 5:
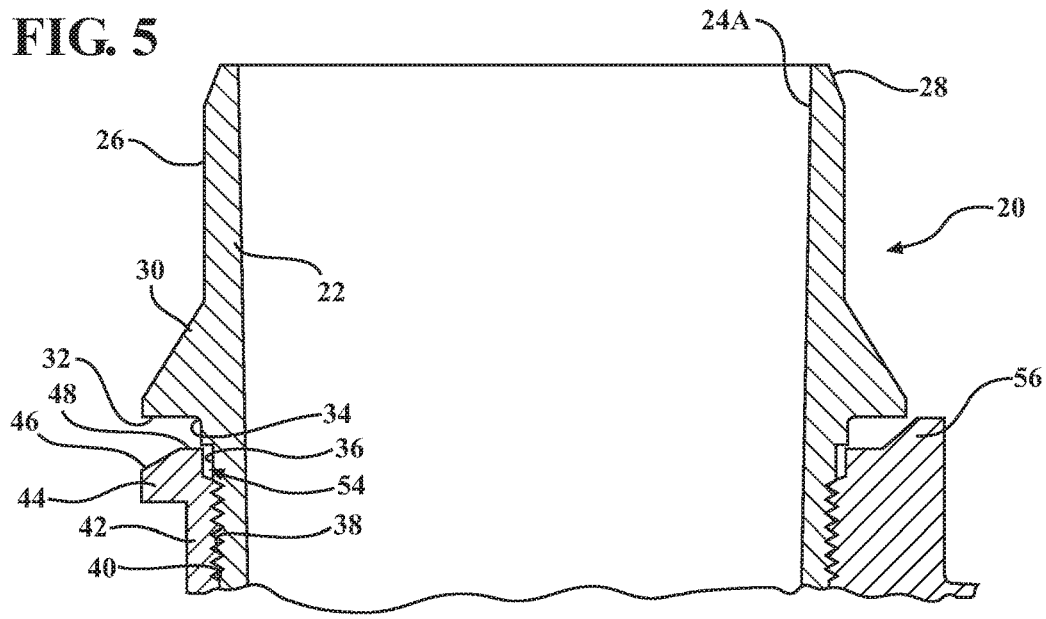
FIG. 5 is a sectional side view taken along lines 5-5 of FIG. 1.

The following description of the preferred embodiment(s) is merely exemplary in nature and is in no way intended to limit the invention, its application, or uses.

An electronic throttle control assembly having an adapter assembly according to the present invention in shown in the Figures generally at 10. The assembly 10 includes a throttle body housing 12, and formed as part of the housing 12 is a central port, shown generally at 14, through which air passes during operation of the assembly 10. There is a shaft (not shown) which extends through part of the central port 14, where the shaft is rotatable, and mounted to the shaft is a valve plate (also not shown).

The shaft is mounted in a bore 16 formed as part of the housing 12. The housing 12 also includes a cavity, shown generally at 18, and disposed in the cavity 18 is an actuator (not shown). The actuator is used for controlling a gear assembly, which is then connected to the shaft, thereby controlling the position of the valve plate in the central port 14. Changing the position of the valve plate controls the flow of air through the central port 14.

The assembly 10 also includes an adapter assembly, shown generally at 20. The adapter assembly 20 includes a housing portion 22, and formed as part of the housing portion 22 is a first aperture 24A, which forms part of the central aperture 14, and is of a substantially constant diameter. The housing portion 22 also includes a first diameter portion 26 which is adjacent a first tapered portion 28. The housing portion 22 also has a second tapered portion 30 which is adjacent the first diameter portion 26.

Adjacent the second tapered portion 30 is a first retaining surface 32, adjacent the retaining surface 32 is a second diameter portion 34, and adjacent the second diameter portion 34 is a third diameter portion 36. Formed as part of the third diameter portion 36 is a first threaded section 38. When the adapter assembly 20 is attached to the housing 12, the first threaded section 38 is engaged with a second threaded section 40, which is formed as part of an upper flange section 42 of the housing 12. The threaded sections 38,40 are both part of a connecting feature used for connecting the adapter assembly 20 to the housing 12, however, it is within the scope of the invention that other types of connecting features may be used.

The upper flange section 42 includes a second aperture 24B which is substantial alignment with the first aperture 24A. Both apertures 24A,24B make up portions of the central port 14. Also integrally formed with the upper flange section 42 is a retention feature 44 having a third tapered portion 46, and adjacent the third tapered portion 46 is a second retaining surface 48.

During assembly, the adapter assembly 20 is connected to the upper flange section 42 of the housing 12 by rotating the assembly 20 such that the first threaded section 38 engages with the second threaded section 40. The housing portion 22 is rotated until an end surface 50 of the third diameter portion 36 contacts a stopper surface 52 of the upper flange section 42. The adapter assembly 20 may be tightened as required. There may also be a thread sealer used in between the threaded sections 38,40 for providing a seal, where the excess sealant may flow into a cavity, shown generally at 54, between the third diameter portion 36 and the retention feature 44.

Figure 6:
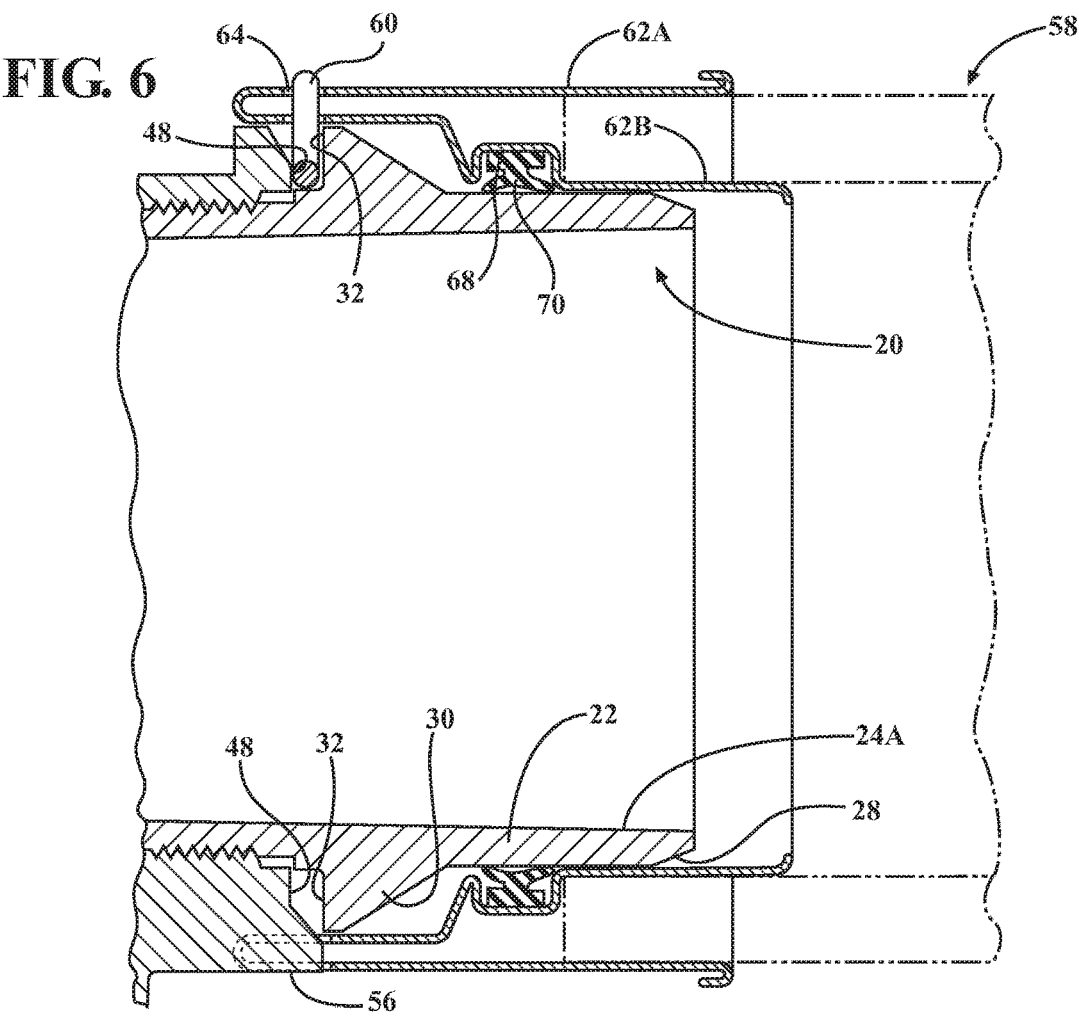
FIG. 6 is a sectional side view of an electronic throttle control assembly having an adapter assembly, with a conduit attached to the adapter assembly, according to embodiments of the present invention.

Another feature of the present invention is a locking tab 56 integrally formed with the upper flange section 42 of the housing 12. The locking tab 56 is used when a conduit 58, a portion of which is shown in FIGS. 6 and 7, having a clamping feature is attached to the adapter assembly 20 and the housing 12. Because the adapter assembly 20 is a separate component, and the locking tab 56 is formed as part of the upper flange section 42 and the housing 12, the locking tab 56 may be formed anywhere around the circumference of the upper flange section 42, for suitable connection with the conduit 58 as desired.

When assembled, the first diameter portion 26 extends into a portion of the conduit 58, which in this embodiment is an air intake conduit 58, with the connection facilitated by the first tapered portion 28. The conduit 58 includes some type of attachment feature, which in this embodiment is a snap-ring 60, which may be suitable for being located between the retaining surfaces 32,48 when the conduit is connected to the adapter assembly 20. The snap-ring 60 may have an irregular or wave shape, or as with this embodiment, the snap-ring 60 is generally triangular in shape, and includes multiple shaft portions 66, which flex and deflect when being placed between the retaining surfaces 32,48. The conduit 58 includes a shell portion, which includes both an outer shell 62A, and an inner shell 62B. There are multiple apertures 64, which are shown in FIGS. 6-7, integrally formed with both shells 62A,62B, which the shaft portions 66 of the snap-ring 60 are at least partially located in after assembly, such that a portion of the shaft portions 66 are located between the retaining surfaces 32,48. The snap-ring 60 also includes two tab features 72, and during assembly, the tab features 72 initially contact the conduit 58 and cause the snap-ring 60 to deflect, such that as the snap-ring 60 is moved into position, the shaft portions 66 move into the apertures 64.

The conduit 58 also includes a cut-out portion, or a notch 74, which the locking tab 56 extends into when the conduit 58 is connected to the adapter assembly 20 and the housing 12, this further facilitates a proper fit between the conduit 58 and the adapter assembly 20. As mentioned above, the locking tab 56 may be formed anywhere around the circumference of the upper flange section 42. The conduit 58 may also be positioned relative to the adapter assembly 20 in any manner to allow the locking tab 56 to extend into the notch 74, regardless of where around the circumference of the upper flange section 42 the locking tab 56 is located.

There is also a groove 68 formed as part of the inner shell 62B, and a seal 70 is disposed in the groove 68, such that the seal 70 is also in contact with the first diameter portion 26.

Another feature of the adapter assembly 20 is that the housing 12 is formed as a single component, and the adapter assembly 20 is formed as a single component. Neither of the housing 12 or the adapter assembly 20 have any joints or weld seams, further preventing leaks.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
an electronic throttle control assembly, including:
a throttle body housing;
an upper flange section formed as part of the throttle body housing;
an adapter assembly;
a central port, a portion of the throttle body housing forming part of the central port, and a portion of the adapter assembly forming part of the central port;
a connecting feature; and
a locking tab integrally formed with the upper flange section;
wherein the adapter assembly is connected to the upper flange section by the connecting feature, and the adapter assembly is positioned relative to the throttle body housing independently of where the locking tab is located.

2. The apparatus of claim 1, the adapter assembly further comprising:
a housing portion;
a first aperture formed as part of the housing portion, the first aperture being part of the central port;
a first diameter portion formed as part of the housing portion, the first diameter portion being part of the first aperture; and
a first retaining surface formed as part of the housing portion;
wherein the connecting feature is used to connect the housing portion to the upper flange section.

3. The apparatus of claim 2, further comprising:
a second diameter portion formed as part of the housing portion, the second diameter portion being part of the first aperture;
wherein the first retaining surface is substantially perpendicular to the second diameter portion.

4. The apparatus of claim 3, further comprising:
a first tapered portion formed as part of the housing portion; and
a second tapered portion formed as part of the housing portion, and the first retaining surface is formed as part of the second tapered portion;
wherein the first tapered portion is adjacent the first diameter portion, and the second tapered portion is disposed between the first diameter portion and the second diameter portion.

5. The apparatus of claim 3, further comprising a third diameter portion formed as part of the housing portion, the third diameter portion being part of the first aperture, wherein the third diameter portion is adjacent the second diameter portion.

6. The apparatus of claim 5, the connecting feature further comprising:
a first threaded section formed as part of the third diameter portion; and
a second threaded section formed as part of the upper flange section;
wherein the adapter assembly is connected to the upper flange section of the throttle body housing by rotating the assembly such that the first threaded section engages with the second threaded section.

7. The apparatus of claim 5, further comprising:
an end surface formed as part of the third diameter portion; and
a stopper surface formed as part of the upper flange section;
wherein the housing portion is rotated until an end surface of the third diameter portion contacts the stopper surface of the upper flange section.

8. The apparatus of claim 5, further comprising:
a retention feature integrally formed with the upper flange section;
a third tapered portion formed as part of the retention feature; and
a second retaining surface formed as part of the retention feature adjacent the third tapered portion;
wherein a cavity is formed between part of the third diameter portion and the retention feature, and the second retaining surface is substantially parallel to the first retaining surface when the adapter assembly is connected to the throttle body housing, and a conduit is connected to the adapter assembly such that an attachment feature of the conduit is disposed between the first retaining surface and the second retaining surface.

9. The apparatus of claim 8, further comprising a thread sealer for providing a sealed connection for the connection feature, a portion of the thread sealer being disposed in the cavity.

10. The apparatus of claim 1, wherein the locking tab is integrally formed around the circumference of the upper flange section.

11. The apparatus of claim 1, wherein the adapter assembly is jointless and seamless, and the throttle body housing is jointless and seamless.

12. An adapter assembly, comprising:
a housing portion;
a first aperture formed as part of the housing portion;
a first diameter portion integrally formed with the housing portion, the first diameter portion being part of the first aperture;
a first tapered portion integrally formed with the housing portion adjacent the first diameter portion;
a second diameter portion formed as part of the housing portion adjacent the first tapered portion, the second diameter portion being part of the first aperture;
a third diameter portion formed as part of the housing portion, the third diameter portion being part of the first aperture; and
a connecting feature, the connecting feature is used to connect the housing portion to a throttle body housing of an electronic throttle control assembly;
a locking tab being part of the electronic throttle control assembly, the locking tab integrally formed with the upper flange section;
wherein the throttle body adapter is positioned relative to the throttle body housing independently of where the locking tab is located.

13. The adapter assembly of claim 12, further comprising an upper flange section formed as part of the electronic throttle control assembly, wherein part of the connecting feature is part of the upper flange section.

14. The adapter assembly of claim 13, the connecting feature further comprising:
a first threaded section formed as part of the third diameter portion; and
a second threaded section formed as part of the upper flange section;
wherein the adapter assembly is connected to the upper flange section by rotating the assembly such that the first threaded section engages with the second threaded section.

15. The adapter assembly of claim 14, the connecting feature further comprising:

a stopper surface integrally formed with the upper flange section; and an end surface formed as part of the third diameter portion;

wherein after the first threaded section is engaged with the second threaded section, the housing portion is rotated until the end surface of the third diameter portion contacts the stopper surface of the upper flange section.

16. The adapter assembly of claim 12, wherein the locking tab is integrally formed around the circumference of the upper flange section.

17. The adapter assembly of claim 12, further comprising:
a second tapered portion adjacent the first diameter portion;
a first retaining surface formed as part of the second tapered portion;
the electronic throttle control assembly further comprising:
   a retention feature integrally formed with the upper flange section;
   a third tapered portion formed as part of the retention feature; and
   a second retaining surface adjacent the third tapered portion, the second retaining surface being part of the retention feature;
wherein an attachment feature of a conduit is disposed between the first retaining surface and the second retaining surface, and is held between the first retaining surface and the second retaining surface by the locking tab.

18. The adapter assembly of claim 12, the electronic throttle control assembly further comprising a throttle body housing, wherein the upper flange section and the locking tab are integrally formed with the throttle body housing.

19. The adapter assembly of claim 13, the electronic throttle control assembly further comprising:
a second aperture formed as part of the upper flange section; and
a central port, the first aperture being part of the central port, and the second aperture being part of the central port;
wherein the electronic throttle control assembly controls the air flow through the central port.

20. An electronic throttle control assembly, comprising:
a throttle body housing;
a central port formed as part of the throttle body housing;
an upper flange section formed as part of the throttle body housing;
an adapter assembly connected to the throttle body housing, further comprising:
   a housing portion;
   a first aperture formed as part of the housing portion, the first aperture being part of the central port;
   a first diameter portion formed as part of the housing portion, the first diameter portion being part of the first aperture;
   a second diameter portion formed as part of the housing portion, the second diameter portion being part of the first aperture;
   a first tapered portion formed as part of the housing portion such that the first tapered portion is adjacent the first diameter portion;
   a second tapered portion formed as part of the housing portion such that the second tapered portion is disposed between the first diameter portion and the second diameter portion;
   a retaining surface formed as part of the housing portion such that the retaining surface is adjacent the second tapered portion and substantially perpendicular to the second diameter portion;
   a third diameter portion formed as part of the housing portion, the third diameter portion being part of the first aperture;
   a first threaded section formed as part of the third diameter portion;
   a second threaded section formed as part of the upper flange section;
   an end surface formed as part of the third diameter portion;
a retention feature integrally formed with the upper flange section;
a third tapered portion being part of the retention feature;
a second retaining surface adjacent the third tapered portion;
a stopper surface formed as part of the upper flange section;
a locking tab integrally formed with the upper flange section, the adapter assembly is positioned relative to the throttle body housing independently of where the locking tab is located;
wherein the adapter assembly is connected to the throttle body housing by engaging the first threaded section with the second threaded section, and rotating the housing portion until the end surface of the third diameter portion contacts the stopper surface of the upper flange section.

21. The electronic throttle control assembly of claim 20, wherein the second retaining surface is substantially parallel to the first retaining surface, such that an attachment feature of a conduit is disposed between the first retaining surface and the second retaining surface when the conduit is connected to the adapter assembly.

22. The electronic throttle control assembly of claim 21, wherein the attachment feature is held between the first retaining surface and the second retaining surface by the locking tab.

23. The electronic throttle control assembly of claim 20, wherein the locking tab is integrally formed around the circumference of the upper flange section.

24. The electronic throttle control assembly of claim 20, further comprising:
a cavity formed between part of the third diameter portion and the retention feature; and
a thread sealer for providing a sealed connection between the first threaded section and the second threaded section;
wherein a portion of the thread sealer is disposed in the cavity when the end surface of the third diameter portion contacts the stopper surface of the upper flange section.

25. The electronic throttle control assembly of claim 20, wherein the adapter assembly is jointless and seamless, and the throttle body housing is jointless and seamless.

* * * * *